United States Patent
Jia et al.

(10) Patent No.: US 8,438,016 B2
(45) Date of Patent: May 7, 2013

(54) SILENCE-BASED ADAPTIVE REAL-TIME VOICE AND VIDEO TRANSMISSION METHODS AND SYSTEM

(75) Inventors: Weijia Jia, Royal Ascot (HK); Lizhuo Zhang, Changsha (CN); Huan Li, Hubei (CN); Wenyan Lu, Hunan (CN)

(73) Assignee: City University of Hong Kong, Kowloon (HK)

( * ) Notice: Subject to any disclaimer, the term of this patent is extended or adjusted under 35 U.S.C. 154(b) by 1149 days.

(21) Appl. No.: 12/101,048

(22) Filed: Apr. 10, 2008

(65) Prior Publication Data
US 2009/0259460 A1    Oct. 15, 2009

(51) Int. Cl.
*G10L 11/06* (2006.01)
*G10L 19/14* (2006.01)
*G10L 15/20* (2006.01)
*G10L 15/26* (2006.01)

(52) U.S. Cl.
USPC ........... 704/215; 704/208; 704/210; 704/211; 704/214; 704/233; 704/235

(58) Field of Classification Search .................. 704/208, 704/210, 214, 215, 211, 233, 235; 375/240.15, 375/412, 235; 370/252
See application file for complete search history.

(56) References Cited

U.S. PATENT DOCUMENTS

| | | | | |
|---|---|---|---|---|
| 6,629,318 B1* | 9/2003 | Radha et al. | ................. | 725/134 |
| 6,700,893 B1* | 3/2004 | Radha et al. | ................. | 370/412 |
| 7,177,278 B2* | 2/2007 | LeBlanc | ....................... | 370/235 |
| 7,295,247 B2* | 11/2007 | Bang | ............................. | 348/515 |
| 7,502,733 B2* | 3/2009 | Andrsen et al. | ............... | 704/211 |
| 2002/0143988 A1* | 10/2002 | Jensen | ......................... | 709/240 |
| 2004/0086268 A1* | 5/2004 | Radha et al. | .................. | 386/111 |
| 2005/0058145 A1* | 3/2005 | Florencio et al. | ............. | 370/412 |
| 2007/0083666 A1* | 4/2007 | Apelbaum | .................... | 709/231 |
| 2007/0115388 A1* | 5/2007 | Apelbaum | ................. | 348/430.1 |
| 2009/0198490 A1* | 8/2009 | Eckhart et al. | ................ | 704/215 |

OTHER PUBLICATIONS

Liu et al, Adaptive Delay Concealment for Internet Voice Application With Packet-Based Time-Scale Modification, IEEE, pp. 1461-1464, 2001.*
Shutang Yang, Shengsheng Yu and Jingli Zhou et al., Multipoint communications with speech mixing over IP network, Computer Communications 25 (2001) (1), pp. 46-55.*

* cited by examiner

*Primary Examiner* — Edgar Guerra-Erazo
(74) *Attorney, Agent, or Firm* — Heslin Rothenberg Farley & Mesiti P.C.

(57) ABSTRACT

A client for silence-based adaptive real-time voice and video (SAVV) transmission methods and systems, detects the activity of a voice stream of conversational speech and aggressively transmits the corresponding video frames if silence in the sending or receiving voice stream has been detected, and adaptively generates and transmits key frames of the video stream according to characteristics of the conversational speech. In one aspect, a coordination management module generates video frames, segmentation and transmission strategies according to feedback from a voice encoder of the SAVV client and the user's instructions. In another aspect, the coordination management module generates video frames, segmentation and transmission strategies according to feedback from a voice decoder of the SAVV client and the user's instructions. In one example, the coordination management module adaptively generates a key video frame when silence is detected in the receiving voice stream.

18 Claims, 10 Drawing Sheets

SILENCE-BASED ADAPTIVE REAL-TIME VOICE AND VIDEO TRANSMISSION METHODS AND SYSTEM

TECHNICAL FIELD

The present invention relates in general to real-time voice and video communication over the Internet, and in particular to systems for managing the voice and video streams when conversational speech patterns are considered.

BACKGROUND OF THE INVENTION

As the development of the network facilities proceeds, Video and Voice over IP (VVoIP) has become one of the most popular applications over the Internet, with millions of users all over the world. The benefits of VVoIP over traditional video phones are that: 1) the VVoIP application is free, or much cheaper than the traditional video phones, 2) the quality of a successful VVoIP application is quite good; 3) convenience: it is extraordinarily easy to get a device with Internet connection nowadays. The most successful VVoIP applications currently include SKYPE, GTALK, MSN and EYEBEAM.

SKYPE uses a proprietary protocol stack for signaling process and transmission. It provides high quality video call service among PCs for free, and a fairly good voice call service to traditional telephone networks through its Internet-PSTN gateway at a very attractive price. However, all of the protocols in SKYPE are proprietary, including signaling and transmission protocols. Although some of the working groups commit themselves to analyze SKYPE user management and media transmission policies, there are still a lot of details we do not know. Currently there is no way for anyone outside SKYPE to study and improve the media transmission in SKYPE.

On the other hand, GTALK, Eyebeam and MSN all conform to the SIP/SDP (Session Initiation Protocol/Session Description Protocol) signaling protocol stack proposed by IETF (Internet Engineering Task Force), which is the most popular signaling protocol today. The media transmission components of MSN and Eyebeam are also all strictly based on standards proposed by IETF or ITU (International Telecommunication Union). These standards work quite well in a VoIP system without video stream.

However, when a real-time video stream is introduced, the quality of a voice stream is seriously degraded. This phenomenon is mainly caused by the different characteristics of voice and video streams. For example, an encoded video frame can be as large as several kilobytes, while the size of an encoded voice frame is no more than 50 bytes in general. If video frames are sent out without considering the voice stream, the interval of the voice frames before and after the video frames may be elongated in a way that it would affect the quality of the voice.

Some solutions have been proposed to handle transmission coordination between real-time voice stream and video stream. However, no work is known to have been published on adaptive transmission of real-time voice and video streams that takes into account the on-off patterns in conversational speech. Conversational speech is a sequence of contiguous segments of speech (on pattern) and silence (off-pattern). The related parameters about talk duration and rate in conversational speech are shown in P.59, which is an artificial conversational speech standard proposed by ITU in 1993. A technique, called silence suppression, identifies and rejects transmission of silence periods, in order to reduce Internet traffic or allow per-spurt playout delay adjustment.

In the aspect of the present invention, a set of strategies on Silence-Based Adaptive Real-Time Voice and Video Transmission (SAVV) are presented. The present invention also describes in detail an SAVV client system that implements the SAVV strategies.

SUMMARY OF THE INVENTION

According to the present invention there is provided a method of real-time voice and video transmission between a transmitting party and a receiving party using silent periods and talk-spurt characteristics of conversational speech. The method comprises detecting silence information from a voice codec at the transmitting party, dividing a current video stream comprising multiple frames of the video transmission into a plurality of video fragments according to one or more characteristics of one or more silent periods in a transmission voice stream, wherein the plurality of video fragments vary in size based on the one or more characteristics of the one or more silent periods in a transmission voice stream. The method further comprises transmitting the plurality of video fragments preferentially during one or more silent periods, receiving the plurality of video fragments and a plurality of voice fragments at the receiving party, and playing back the plurality of video fragments and the plurality of voice fragments at the receiving party.

In preferred aspects of the invention video frames are divided according to silence information obtained from a voice encoder and a transmitting voice stream analyzer. Preferably, the dividing comprises: dividing the current video frame according to a ratio between video frame size and voice frame size, and increasing a size of a current video fragment when a current voice frame is a silent frame.

The transmitting may preferably comprise: transmitting the current voice frame via a voice transmission port, and transmitting the current video fragment immediately after transmitting the current voice frame via a video transmission port. Alternatively, the transmitting may comprise: associating the current video fragment to the current voice frame, and transmitting current voice packets and current video packets via a conventional transmission port.

According to preferred aspects the dividing may further comprise: dividing the current video frame according to a ratio between video frame size and voice frame size, incrementing a size of a current video fragment when a current voice frame is a silent frame, and iteratively adjusting a size of a next video fragment. In such aspects, the transmitting may comprise: transmitting the current voice frame via a voice transmission port, and transmitting the current video fragment immediately after transmitting the current voice frame via a video transmission port, or alternatively may comprise: associating the current video fragment to the current voice frame, and transmitting current voice packets and current video packets via a conventional transmission port.

In preferred aspects of the invention, the method may further comprise generating a plurality of video frames dependent on one or more characteristics of one or more silent periods in a voice stream as received at the receiving party. Preferably, for example, one or more key video frames may be generated according to silence information obtained from a voice decoder and a receiving voice stream analyzer. In such an aspect, the generating may comprise obtaining silence information from the receiving voice stream analyzer, and instructing a video encoder to generate a key video frame if a chosen number of consecutive receiving voice frames are silent frames, or if a maximum time interval between two consecutive key video frames is exceeded.

According to the invention there is also provided apparatus for managing real-time voice and video transmission. The apparatus comprises a memory, and a processor in communications with the memory to perform a method of real-time voice and video transmission between a transmitting party and a receiving party using silent periods and talk-spurt characteristics of conversational speech. The method comprises capturing, encoding, buffering and sending real-time voice and video data, and receiving, buffering, decoding and playback of the real-time voice and video data. The apparatus further comprises collecting and analyzing silence information in a transmitting voice stream, generating and updating video stream transmission strategies based on the analyzed silence information, and dividing a current video stream comprising multiple frames of the video transmission into a plurality of video fragments varying in size according to a current video stream transmission strategy.

Preferably, the apparatus further comprises a receiving voice stream analyzer for collecting and analyzing the silence information in the receiving voice stream, and wherein the management module receives data from the receiving voice analyzer as a second input.

BRIEF DESCRIPTION OF THE DRAWINGS

The invention will now be described by way of example and with reference to the accompanying drawings, in which.

DETAILED DESCRIPTION OF PREFERRED EMBODIMENTS

As will be described in more detail in the following, a silence-based adaptive real-time voice and video (SAVV) client and corresponding SAVV methods are proposed that can:

detect the activity of the voice stream, and aggressively transmit the video frames if silence in the sending and/or receiving voice stream has been detected; and adaptively generate and transmit the key frames of the video stream according to the characteristics of the conversational speech.

In particular, for the sending direction, when voice data is captured and sent to the voice encoder, the voice data is encoded to voice frames and sent to the transmission management module directly. The voice encoder also sends the status information of the voice stream to the coordination management module. When video data is captured and sent to the video encoder, the video is encoded according to the directions made by the coordination management module, and sent to the video buffer before the video data is sent to the transmission module. For the receiving direction, when voice frames arrive at the transmission module, they are passed to the voice decoder. The voice decoder decodes the voice frame and sends the data to the voice play back device. Simultaneously, the voice decoder may generate status information of the receiving voice stream to the coordination management module. When video fragments arrive at the transmission module, they are sent to the video buffer until all the fragments of the same video frame arrive at the buffer. The video fragments are then sent to the video decoder, and then to the video playback device.

The coordination management module is the core control component of a SAVV client. The coordination management module obtains the status information from both the voice encoder and voice decoder of the SAVV client, then updates the video stream generation and transmission strategies. The generation of strategies are comprised of the following steps (to be described in more detail below): processing the adaptive segmentation of video frames according to the status information of the sending voice stream; and optionally processing the adaptive key video frame generation tactics according to the status information of the receiving voice stream.

In addition, the transmission management module provides two transmission strategies: video frame pertaining and video frame separating. In the video frame pertaining strategy, a video fragment is linked to a voice package, which is not completely based on the SIP/SDP/RTP protocol stack, but reduces the total header size of the transmission protocol. In the video frame separating tactic, a video fragment is transmitted after the transmission of a voice frame in a different transmission port.

Through the following description, specific examples are put forward to provide a thorough understanding of the present invention. Nevertheless, it will be understood that not all of the techniques used when implementing an aspect of the present invention are described in every detail. For instance, well-known voice or video codecs are shown in block diagram. These details are intentionally omitted in order not to obscure the present invention in unnecessary detail.

In the aspects of the present invention, a group of Silence-based Adaptive Voice & Video transmission strategies (SAVV) are presented: Static Basic SAVV, Dynamic Basic SAVV, Active SAVV and Passive SAVV. These strategies consider the characteristics of conversational speech in reactive live VVoIP applications, putting forward adaptive tactics to transmit fragmented video packets in silent periods according to the feedback from the sending and receiving voice stream. Conversational speech is a sequence of contiguous segments of speech (on pattern) and silence (off-pattern). The related parameters about talk duration and rate in conversational speech are shown in P.59, which is an artificial conversational speech standard proposed by ITU in 1993. A technique, called silence suppression, identifies and rejects transmission of silence periods, in order to reduce Internet traffic or allow per-spurt playout delay adjustment.

Figure 1:
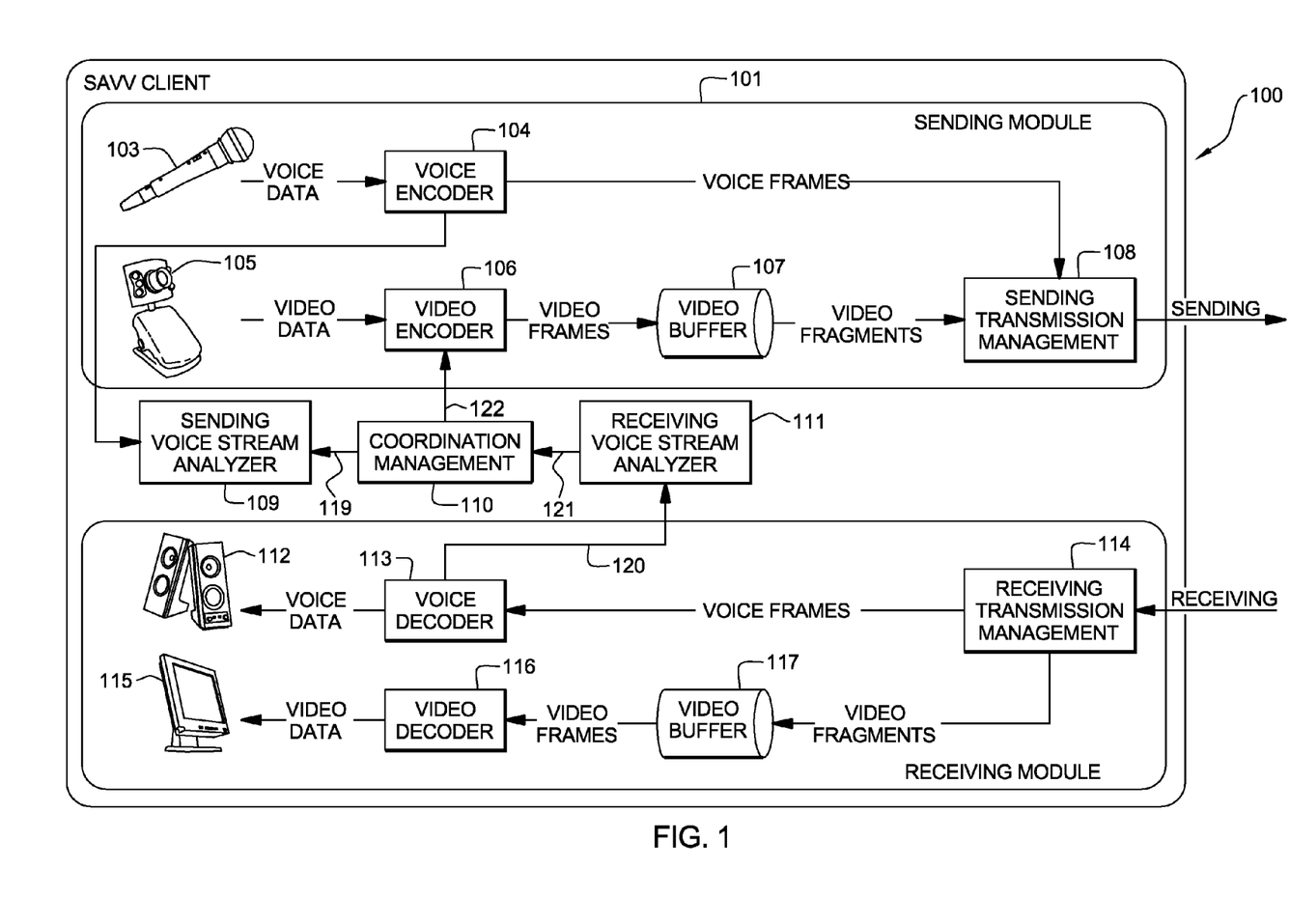
FIG. 1 is a block diagram one example of a client according to one aspect of the present invention.

FIG. 1 is a block diagram of one example of a SAVV client 100 according to an aspect of the present invention. A SAVV client is a carrier of the SAVV strategies and comprises a sending module 101, a receiving module 102, a coordination management module 110 and two voice stream analyzers: a sending voice stream analyzer 109 and a receiving voice stream analyzer 111. The SAVV strategies are implemented in the coordination management module 110.

When voice data are collected from the voice capture device 103 (eg a microphone), they are sent to the voice encoder 104. The encoder 104 encodes the raw data to voice frames according to the voice codec standard being used, which is beyond the scope of the present invention. The encoded voice frames are then sent to the sending transmission management module 108 for RTP and UDP encoding and transmission. Moreover, the voice encoder 104 collects the status information of the sending voice stream, and sends this information to the sending voice stream analyzer 109.

Simultaneously, the video capture device 105 gets raw video data periodically, and sends this data to the video encoder 106. The video encoder 106 encodes the raw video data according to: 1) the chosen video codec standard, and 2) the voice segmentation and transmission tactics from the coordination management module 110. The video encoder generates the video frames and segments them into small fragments according to the tactics 122, and passes them to the video buffer 107. The video buffer 107 sends the video fragments to the sending transmission management module 108 periodically. The sending transmission management module 108 adaptively transmits the voice frames from the voice encoder 104 and the video fragments from the video buffer 107, using one of the transmission strategies in the transmission management module.

For the receiving module 102, when voice or video packets arrive, the receiving transmission management module 114 sorts out the video fragments from the voice frames. The module 114 sends the voice frames directly to the voice decoder 113, while sending the video fragments to the video buffer 117. The voice decoder decodes the voice frames, and puts the decoded voice data to the voice playback device 112. The voice decoder 113 also sends the status information of the receiving voice stream to the receiving voice stream analyzer 111. The video buffer 117 collects and buffers the video fragments until all the fragments of the same video frame are received, or a time limit is exceeded. The video buffer 117 then sends the video frame to the video decoder 116. Video buffer 117 also sorts the receiving video fragments according to either the timestamp on the RTP header of the video fragment, or parameters from any proprietary transmission protocol header. The video decoder 116 decodes the video frames, and sends them to the video playback device 115.

Among the modules in a SAVV client, the coordination management module 110 is the core in which all the SAVV adaptive strategies are implemented and carried out. There are two inputs to the coordination management module are two folds. First, the voice encoder 104 sends the status information of the sending voice stream 118 to the sending voice stream analyzer 109, which is responsible for detecting silent frames in the voice stream and generating corresponding notice messages 119 to the coordination management module 110. Second, the voice decoder 113 collects the status information of the receiving voice stream 120, and sends this information to the receiving voice stream analyzer 111 which is responsible for detecting silent periods in the receiving voice stream and generating notice messages 121 to the coordination management module 110. According to the two input parameters (119,121), the coordination management module 110 updates the parameters of the sending video stream in the video encoder 106. More concretely, the coordination management module 110 sends the revised video frame segmentation tactic and the key video frame generation tactics to the video encoder 106.

Figure 2:
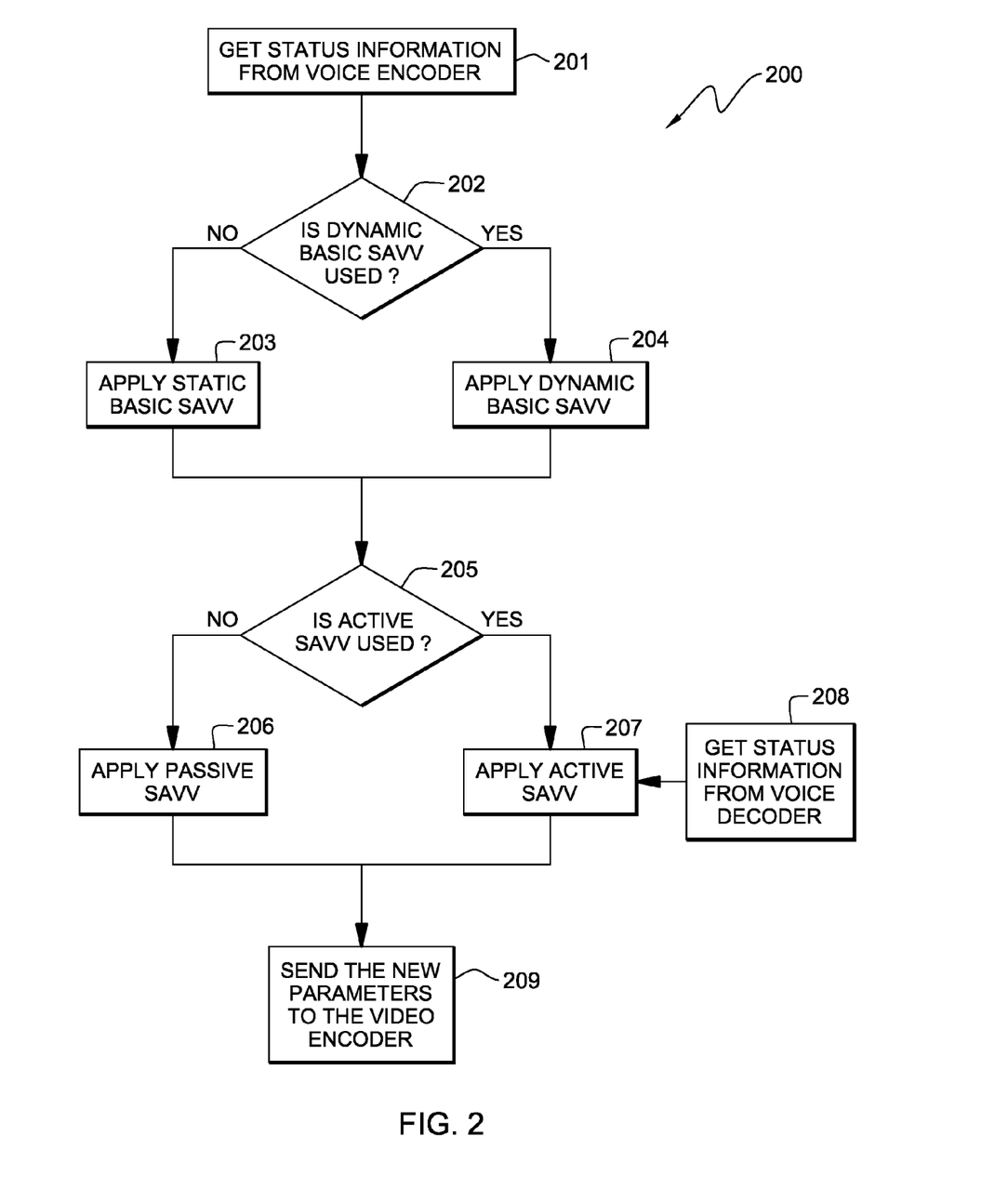
FIG. 2 is a flow diagram of the strategies applied by the coordination management module in FIG. 1 according to another aspect of the present invention.

FIG. 2 is a flow diagram showing example operations of the coordination management module 110. As mentioned in the previous paragraph, the responsibility of the coordination management module 110 includes updating the corresponding parameters of the video encoder 106 according to the status information from the voice encoder 106 and the voice decoder 113 in the SAVV client, and the SAVV strategies chosen by the SAVV client user as well. These strategies include Static Basic SAVV 203, Dynamic Basic SAVV 204 Passive SAVV 206 and Active SAVV 207. When status information from the voice encoder arrives, the coordination management module checks 202 if the Dynamic Basic SAVV strategy is selected by the user. If the answer is yes, Dynamic Basic SAVV strategy 204 is applied, otherwise Static Basic SAVV strategy 203 is applied. Then the coordination module judges 205 if the Active SAVV is chosen by the SAVV client user. If so, the Active SAVV strategy 207 is applied; otherwise, the Passive SAVV strategy 206 is applied. The Active SAVV also obtains status information from the receiving voice stream analyzer 111, which obtains feedback from the voice decoder 113. The output of the coordination management module is the revised parameters for the video encoder 106. Through the following paragraphs, the four SAVV strategies are described in detail.

Figure 3A:
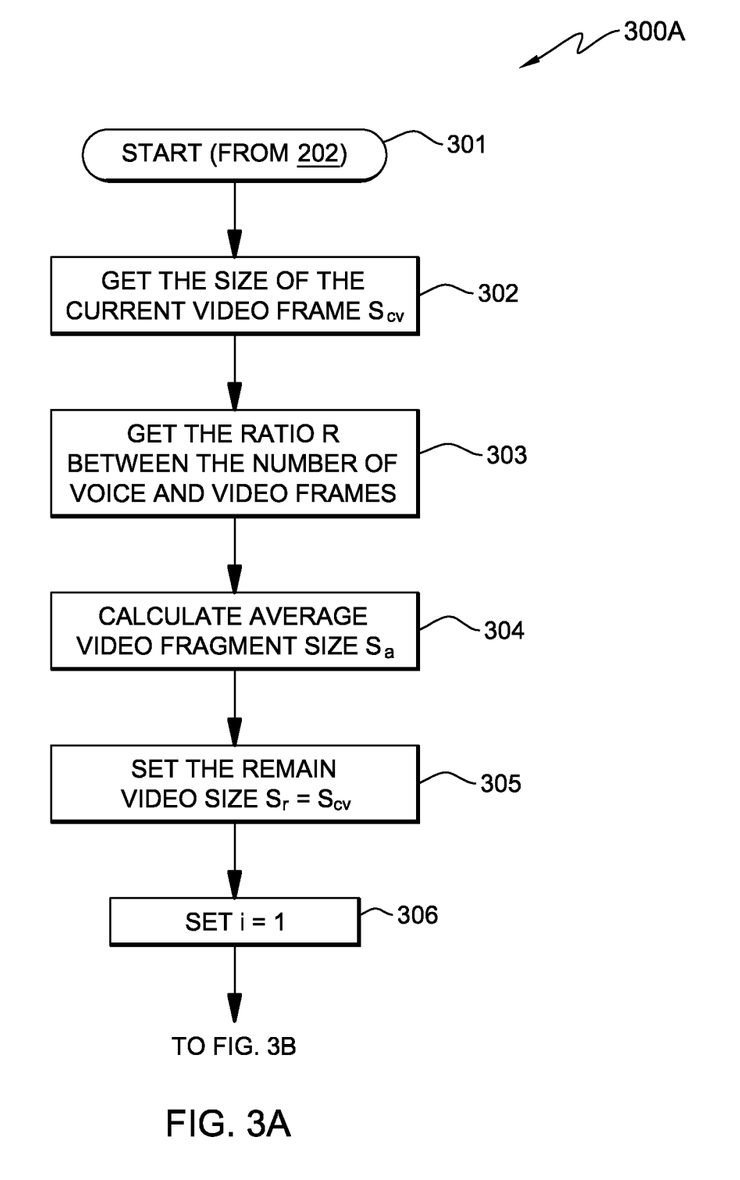
FIGS. 3A and 3B depict a flow diagram of the Static Basic SAVV method and the Dynamic Basic SAVV method, according to other aspects of the present invention.
Figure 3B:
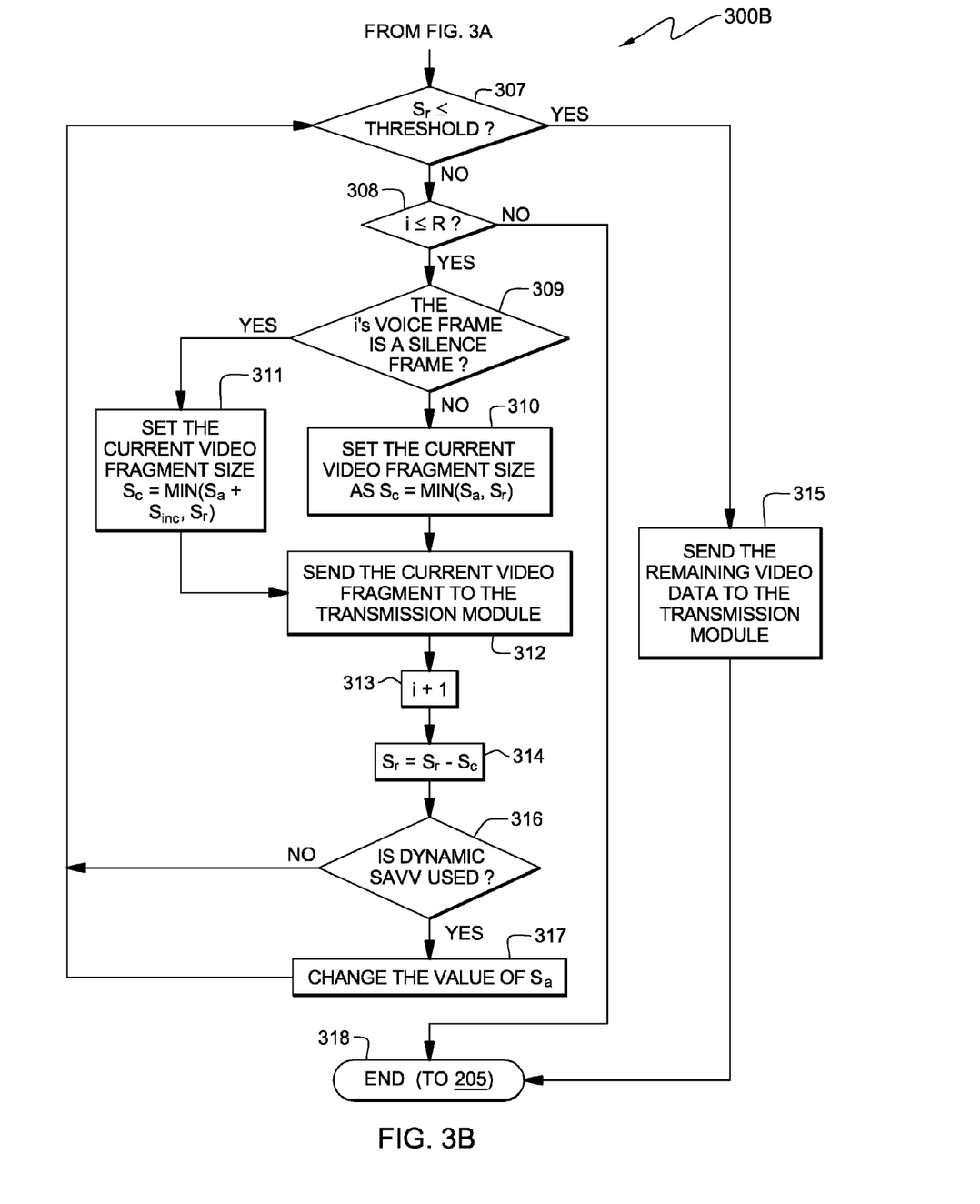

FIGS. 3A and 3B depict a flow diagram 300 of Static and Dynamic Basic SAVV methods. The result of the Basic SAVV module will be a part of the video generation, segmentation and transmission tactics that may be sent to the video encoder 106 to carry out. At step 302 the module first obtains the size of the current video frame $S_{cv}$, then at step 303 calculates the ratio R between the number of the voice and video streams by $$R = \left\lceil \frac{I_{voice}}{I_{video}} \right\rceil$$

where $I_{voice}$ is the sent-out interval between two consecutive voice packets, and the $I_{video}$ is the sent-out interval between two consecutive video packets. After that, in step 304, the Basic SAVV Algorithm module calculates the average video fragment size $S_a = S_{cv}/R$, sets the remaining video data size $S_r = S_{cv}$ (step 305), and sets the loop index i=1 (step 306). Here $S_r$ represents the size of the remaining fragments of the current video frame. Basic SAVV method then checks if $S_r \leq$ THRESHOLD holds (step 307), where THRESHOLD is the minimum video fragment size. The calculation of THRESHOLD is beyond the aspects of the present invention. If $S_r \leq$ THRESHOLD, the remaining video data are sent to the sending transmission module 108 as a single video fragment (step 315), and the Basic SAVV process ends (step 318). Otherwise Basic SAVV module judges if i≦R (step 308). If i>R the process ends because all the data of the current video frame are sent out. If i≦R, Basic SAVV module judges if the current voice frame is a silent frame or not (step 309). If the current voice frame is a silent frame (step 311), then the size of the current video fragment $S_c$ is set as follows:

$$S_c = \mathrm{Min}(S_a + S_{inc}, S_r)$$

where $S_a$ is the average fragment size of the current video frame, $S_{inc}$ is the size of the incremental video data, and $S_r$ is the remaining video data size. If the current voice frame is NOT a silent frame (step 310), the size of the current video fragment $S_c$ is calculated as follows:

$$S_c = \text{Min}(S_a, S_r)$$

The newly generated video fragment is then sent to the sending transmission module (step 312). The index i is increased by one (step 313), and the size of the remaining video data are set to be $S_r = S_r - S_c$ (step 314). Finally, if Dynamic Basic SAVV is applied, the size of the average video fragment $S_a$ is updated according to the following equation:

$$S_a = \frac{S_r}{R - (i - 1)}$$

Then the thread loops back to step 307. If Dynamic Basic SAVV is not applied, the thread directly loops back to 307.

The major difference between Static Basic SAVV and Dynamic Basic SAVV is explained in the following. Static Basic SAVV is an optimum solution. Its objective is to transmit the video data as quickly as possible, as long as the video transmission does not influence the quality of the voice stream. On the other hand, the objective of Dynamic Basic SAVV objective is to transmit the video data evenly in fragment size, as long as the video transmission does not influence the quality of the voice stream. Which of these Basic SAVV strategies should be used depends on the characteristics of the upper layer application. After the Static Basic SAVV 203 or the Dynamic Basic SAVV 204 is performed, the method will then determine if the Active SAVV tactic 207 is used or the Passive SAVV tactic 206 is used, according to the user's instructions.

Figure 4:
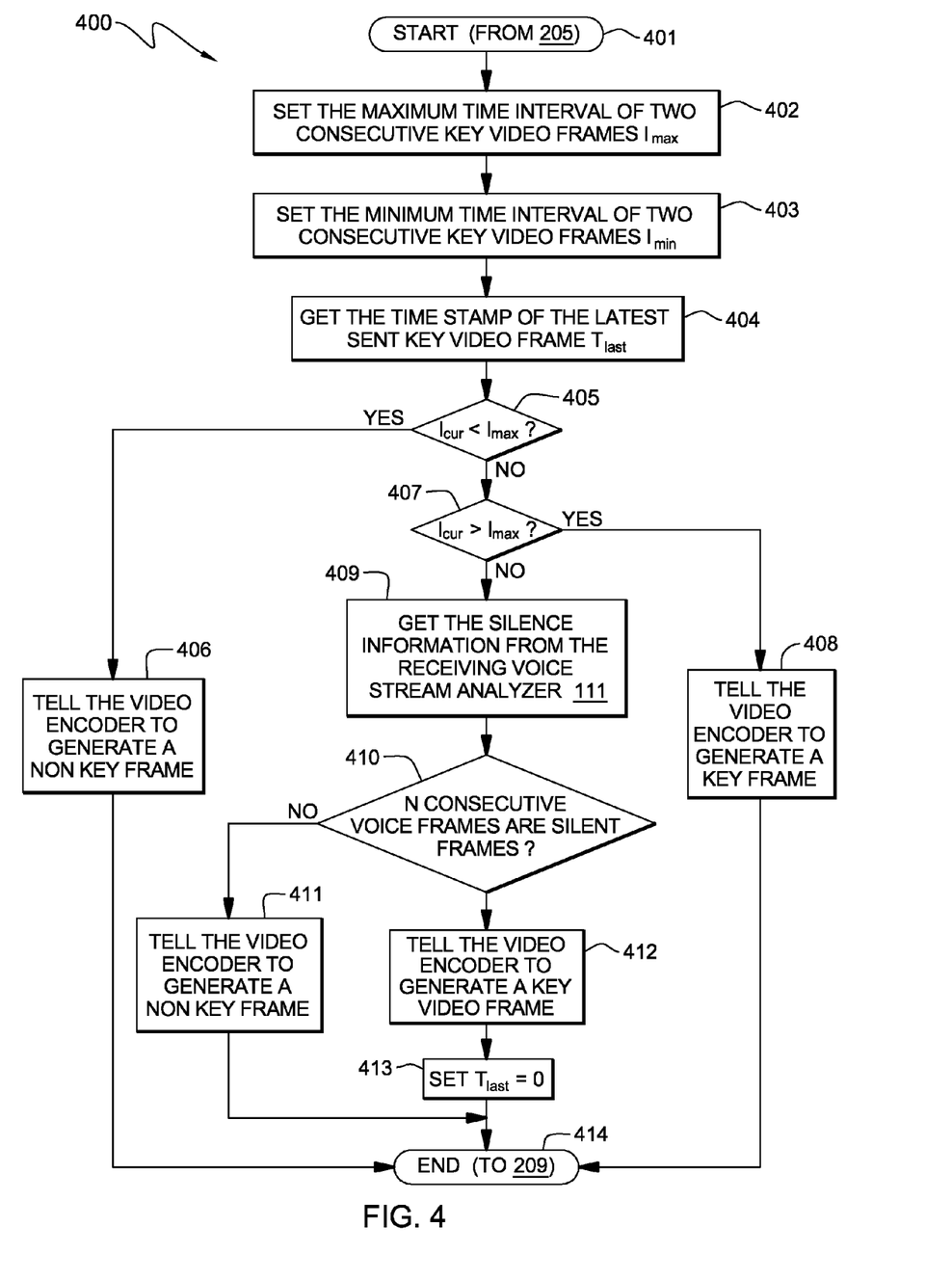
FIG. 4 is a flow diagram of the Active SAVV method according to another aspect of the present invention.

FIG. 4 is a flow diagram 400 of one example of an Active SAVV method used in an aspect of the invention. Before describing in detail the method flow, some background knowledge should be presented in order to better understand the aspects of the present invention. During encoding, video frames are classified into two categories labeled with key frame or "I-frame", and non-key frame or "P-frame". I-frame is a key frame with no reference frame. An I-frame can restore a decoder error due to packet loss. P-frame is not a key frame. A P-frame is encoded with reference to the previous frame and contains only data that has changed from the preceding I-frame (such as color or content changes). Because of this, P-frames depend on the I-frames to fill in most of the data. In general, I-frames contain more information than P-frames, and so they are always larger in size.

The flow diagram of FIG. 4 is a detailed description of one example of the Active SAVV process 207, which is part of the aspect described above with regard to the Coordination Management Module 110. The Active SAVV Algorithm first sets the maximum time interval $I_{max}$ of two consecutive key video frames (step 402), and the minimum of two consecutive key video frames $I_{min}$ (step 403). Therefore, the k+1's key video frame should be sent out no early than $I_{min}$ after the sending of the k's key video frame; and no later than $I_{max}$ after the sending of the k's key video frame. The sequence of the sending time $T_k$ of key video frames are shown in the following equation.

$$T_{k+1} \in [T_k + I_{min}, T_k + I_{max}], k \in N$$

After the first two steps, Active SAVV Algorithm 400 obtains the time interval $I_{cur}$ (step 404) between the time the last key video frame was sent and the current time. Current time can be obtained by operating system interfaces, which is beyond the scope of the present invention. The method then compares $I_{cur}$ with $I_{min}$ (step 405). If $I_{cur}$ is less than $I_{min}$, the method tells the video encoder 106 to generate a non key video frame (step 406). Otherwise, the method compares the $I_{cur}$ with $I_{max}$ (step 407). If $I_{cur}$ is larger than $I_{max}$, then a key video frame must be generated and sent immediately to meet the video quality requirement of the user. Therefore the method tells the video encoder 106 to generate a key video frame (step 408). If both of the comparisons (405,407) do not hold, the Adaptive SAVV Algorithm should fetch the silence information from the receiving voice stream analyzer 111, which is responsible for providing the number of consecutive silent voice frames to the coordination management module 110. If N consecutive voice frames are silent frames (step 410), Adaptive SAVV 400 tells the video encoder 106 to generate a key video frame (step 412), and sets the sending time of the current video frame as the time of the last key video frame $T_{last}$ (step 413). Otherwise, Adaptive SAVV 400 tells the video encoder 106 to generate a non key video frame (step 411). Finally the Adaptive SAVV Algorithm ends.

The knowledge behind the Active SAVV is the characteristic of voice streams over conversational speech that can help decide the start of a silence of one side. During a conversation, normally if one side is speaking, the other side will keep silence with high probability. According to the statistical results shown in the ITU P.59 standard, when a conversation is established between two sides, say Alice and Bob, the probability of Alice pausing while Bob is talking is calculated as follows:

$$\frac{p_T - p_D}{p_T} = \frac{38.53\% - 6.59\%}{38.53\%} = 82.90\%$$

where $p_T$ and $p_D$ are the talk-spurt rate and double talk rate, respectively. So if Alice starts to be silent, at the same time if she is able to tell in real-time whether Bob is talking or not, then the host on Alice side can actively generate key video frame and send it out according to this silence detection. In Active SAVV, a peer assistance technique is applied to decide the "real silence starting point". That is: a relatively long silence period instead of a silence-like period between two consecutive words.

Figure 5:
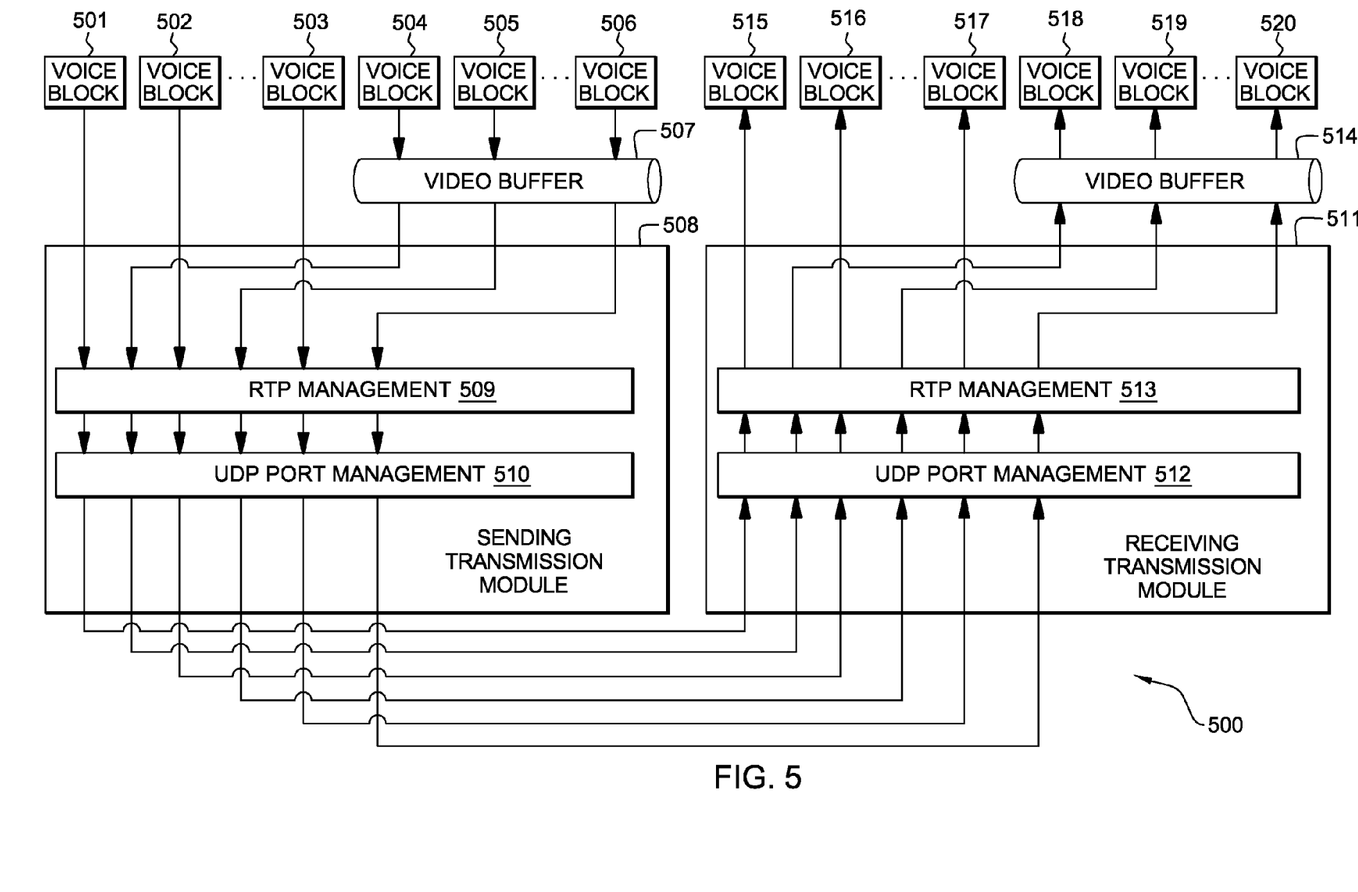
FIG. 5 is a block diagram of one example of the sending and receiving transmission management module that transmits and receives voice and video packets in different ports according to an aspect of the invention.

FIG. 5 is a block diagram 500 of one example of the transmission management module using a separate (pipeline) strategy. Every time a voice frame 501-503 arrives at the sending transmission module 508, it is sent directly to RTP management module 509 to add corresponding RTP header, and then sent to the UDP port management module 510 to add corresponding UDP header. The RTP and UDP encoded voice packet is then sent to the other party of the voice and video call. On the other hand, when the video fragments 504-506 arrive, they are buffered in the video buffer 507. The video buffer 507 sends out a video fragment right after the sending of a voice frame. The RTP management module 509 and the UDP port management module 510 then add a RTP header and a UDP header respectively.

On the receiving end of the call, all the packets of the video call are received by the receiving transmission module 511. When packets arrive, they are sent to the UDP port management module 512 for decoding the UDP header, and the RTP management module 513 for decoding the RTP header. The decoded voice frames 515-517 are sent to the voice decoder 113 instantaneously, while the video fragments are sent to the video buffer 514 until all the fragments of a single video frame arrive at the video buffer. They 518-520 are then sent to the video decoder 116 to decode and playback.

Figure 6:
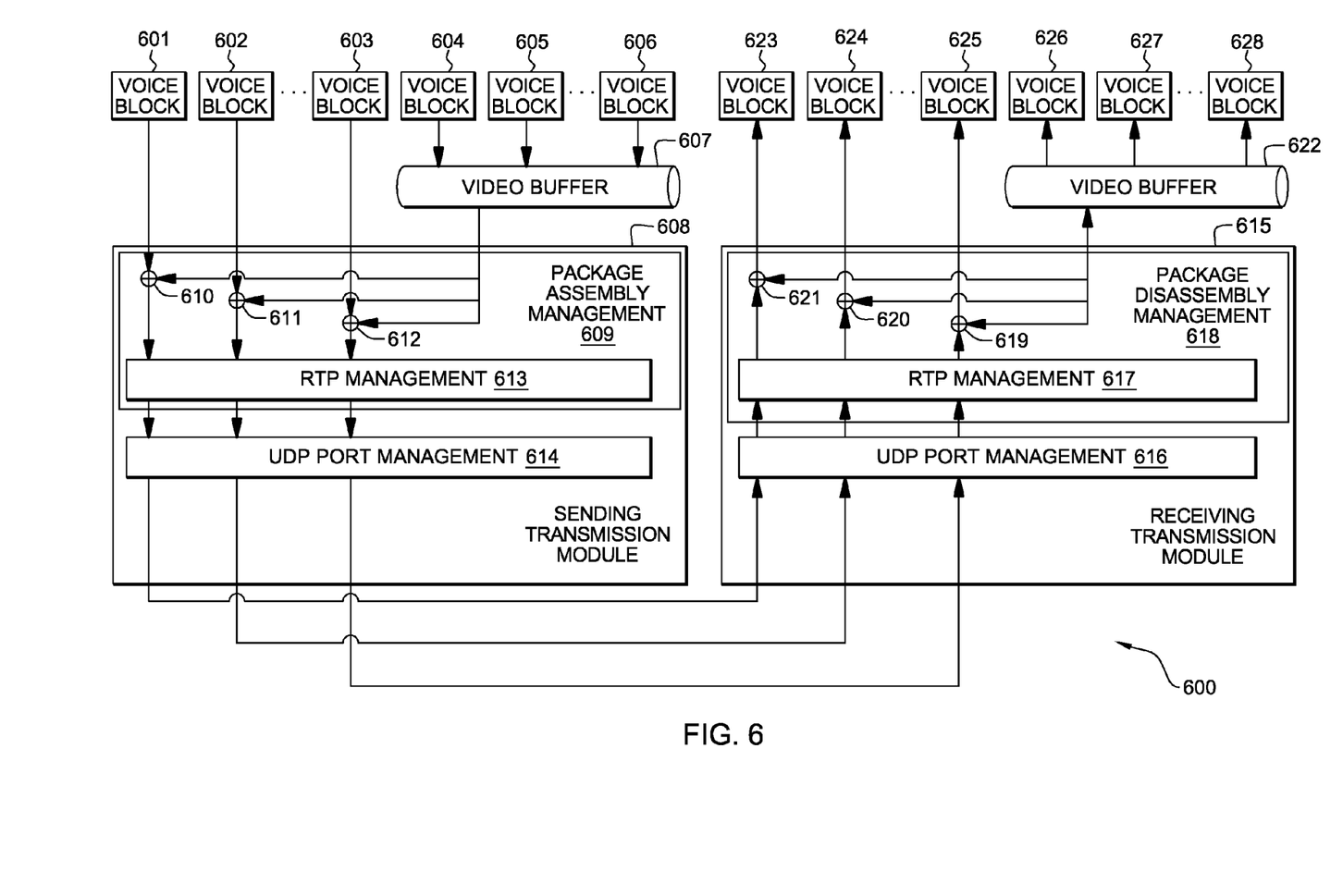
FIG. 6 is a block diagram of one example of the sending and receiving transmission management module that applies the packet assembly and disassembly module according to an aspect of the invention.

FIG. 6 is a block diagram 600 for associated transmission, which is another combined real-time voice and video transmission strategy that may be used in the SAVV client. On the sending side, when video fragments 604-605 arrive, they are sent to the video buffer 607. Each time a voice frame 601-603 arrives at the sending transmission module 608, a video fragment in the video buffer is linked or associated 610-612 to the current voice frame in package assembly management module 609. The mixed packet is then sent to the RTP management module 613 for RTP header encoding and the UDP port management module 614 for UDP header encoding.

At the receiving transmission module 615 of the other party of the voice-video call, the arriving packets are first sent to the UDP port management module 616 for UDP header decoding, and then sent to the RTP management module 617 for RTP header decoding. The mixed frames are then sent to the package disassembly management module 618, which is responsible for partitioning the voice and video sections in the mixed frame. The voice sections or the voice frames 623-625 are sent to the voice decoder 113 directly. The video sections or the video fragments are sent to the video buffer 622 for buffering, until all the fragments of a single video frame are received and buffered. They 626-628 are then sent to the video decoder 116.

Figure 7:
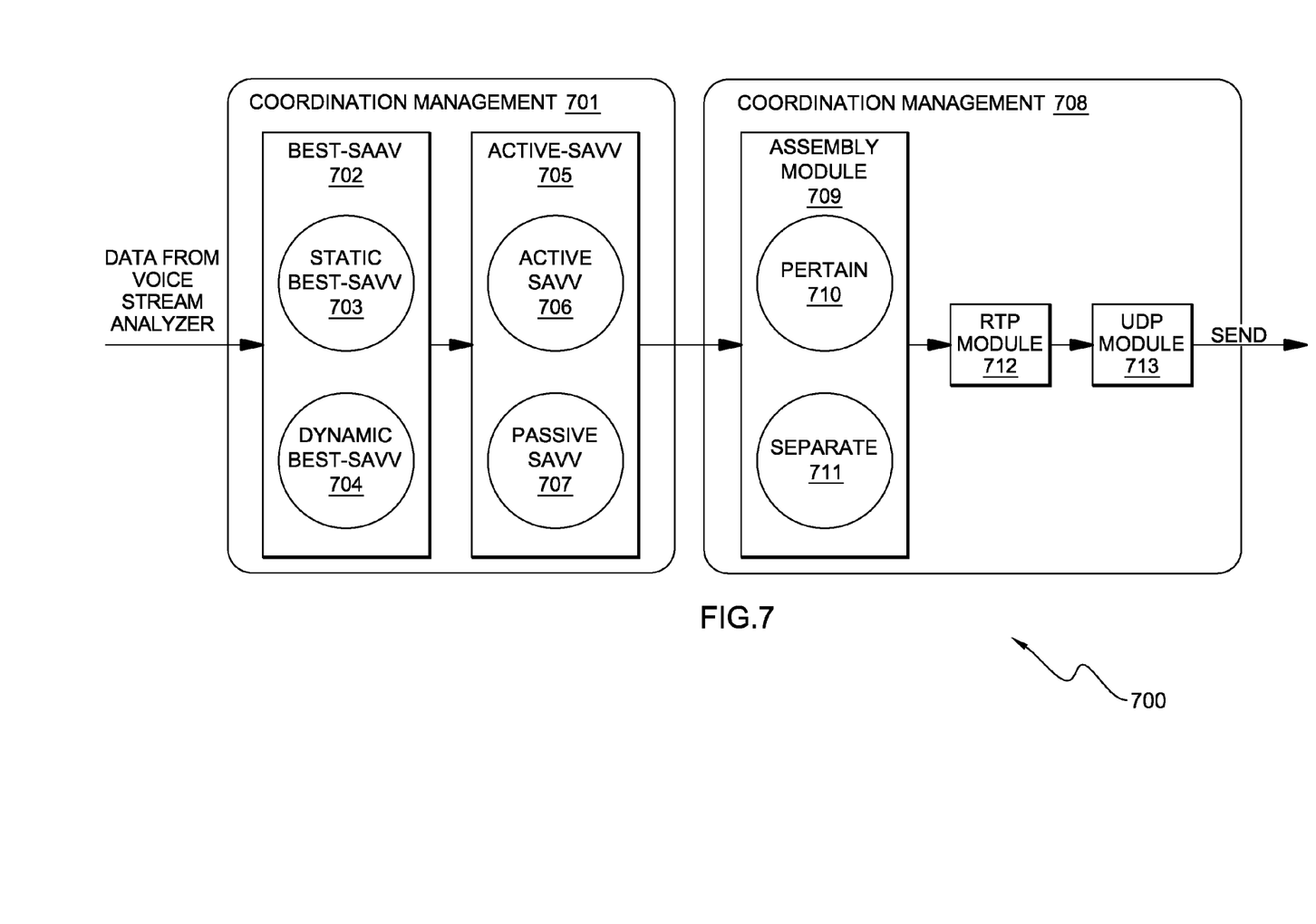
FIG. 7 is a diagram describing the adaptive transmission strategies presented in aspects of the present invention.

FIG. 7 is a diagram 700 which shows an overall picture of the example strategies used in aspects of the present invention. If there are video frames to be sent in the video buffer, the coordination management module 701 may update the generation and segmentation strategies of the video stream. According to the user's choice and the feedback obtained from the voice encoder 104 and sending voice stream analyzer 109, one of the Basic SAVV method 702 applies. The strategies include Static Basic SAVV (703,203) which is used to transmit the video fragments in a best effort way as long as the quality of the voice stream is not affected; and Dynamic Static SAVV (704,204) which is used to transmit the video fragments as evenly as possible. Then based on the user's choice and the feedback obtained from the voice decoder 113 and receiving voice stream analyzer 111, Active SAVV method (706,207) or Passive SAVV method (707,206) is applied. Active SAVV tells the video encoder to generate a key video frame if a series of the receiving voice frames are silent frames. While Passive SAVV method does not consider the silence periods of the other side of the call.

It is the transmission management module's 708 responsibility to assemble and pack the voice frames and video fragments, and send them to the other side of the call. Assembly Module 709 either links or associates the current video fragment to the current voice frames 71 0, or leaves them separated 711. The video fragments and the voice frames are then sent to the RTP module 712 and UDP module 713 for RTP and UDP header encoding. The associating method 710 sends the multimedia packets in a single UDP port, while the separating method transmits the voice packets and video packets in two different UDP ports.

To clearly present the ideas and strategies in the aspects of the present invention, two examples are shown through the next two paragraphs. The first example shows the prior art of the combined real-time voice and video transmission scheme, while the second example shows the current art of the combined real-time voice and video transmission scheme presented in the aspects of the present invention.

Figure 8:
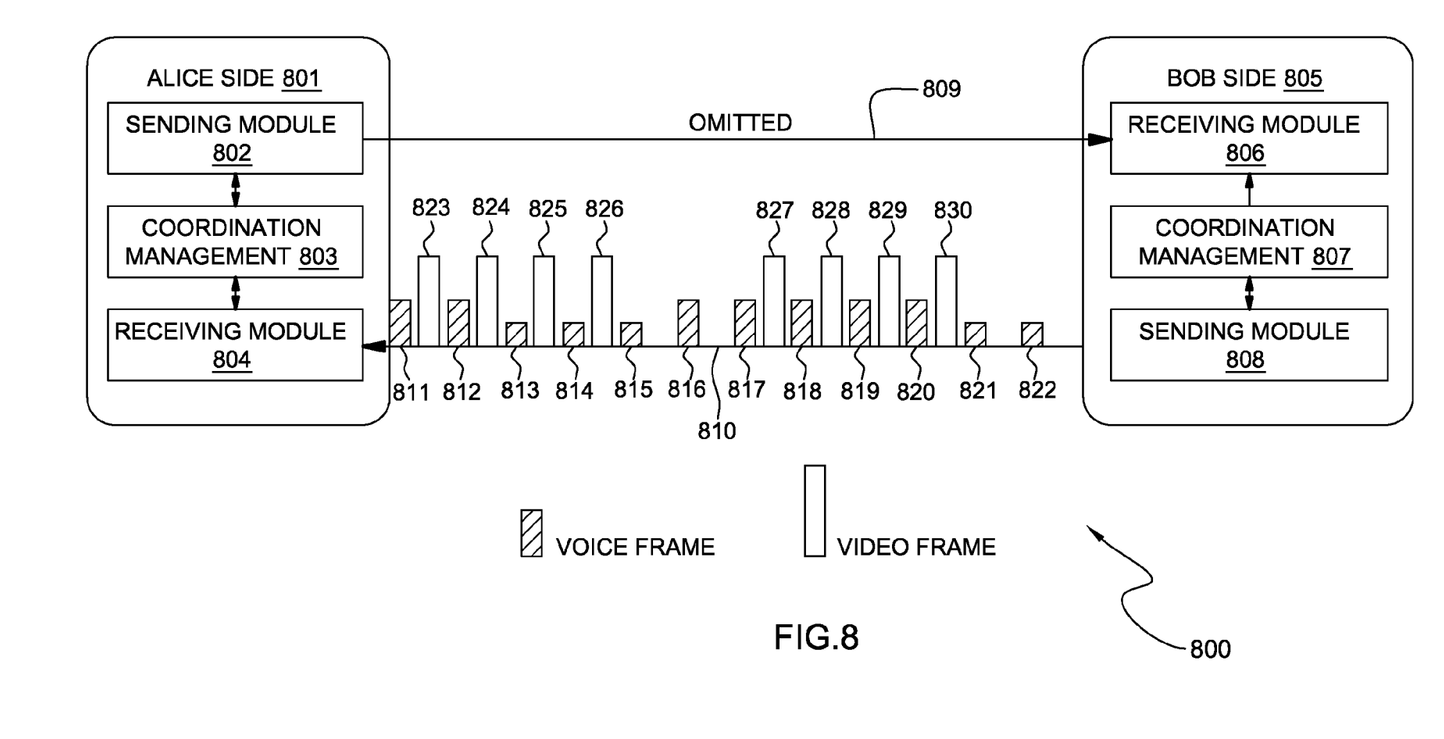
FIG. 8 is a use case diagram which describes the prior art use of combined real-time voice and video transmission strategies.

FIG. 8 is a use case diagram 800 which shows the prior art use of a combined real-time voice and video transmission scheme. The two parties of the video call are named Alice side 801 and Bob side 805. Alice side 801 comprises a sending module 802, a receiving module 804 and a coordination management module 803; while Bob side also has a sending module 808, a receiving module 806 and a coordination management module 807. There are two multimedia streams simultaneously, one 809 from the sending module 802 of Alice side to the receiving module 806 of Bob side, the other 810 from the sending module 808 of Bob side to the receiving module 804 of Alice side. Here the latter stream 810 is explained in detail, where the other direction of the stream 809 is completely the same. In FIG. 8, black blocks (811-822) represent the voice packets containing the voice frames, while the white blocks 823-830 represent the video packets containing the video fragments. For the voice packets, the longer ones represent the talk-spurt voice frames (811-812,816-820), while the shorter ones represent the silent voice frames (813-815,821-822). In the previous arts, the video packets are sent out without consideration of the status of the voice frames, i.e., the different characteristics between silent and talk-spurt voice frames. Therefore, if a video frame is to be sent, the method of the prior art may divide it into fragments, and send them blindly, as depicted in FIG. 8.

Figure 9:
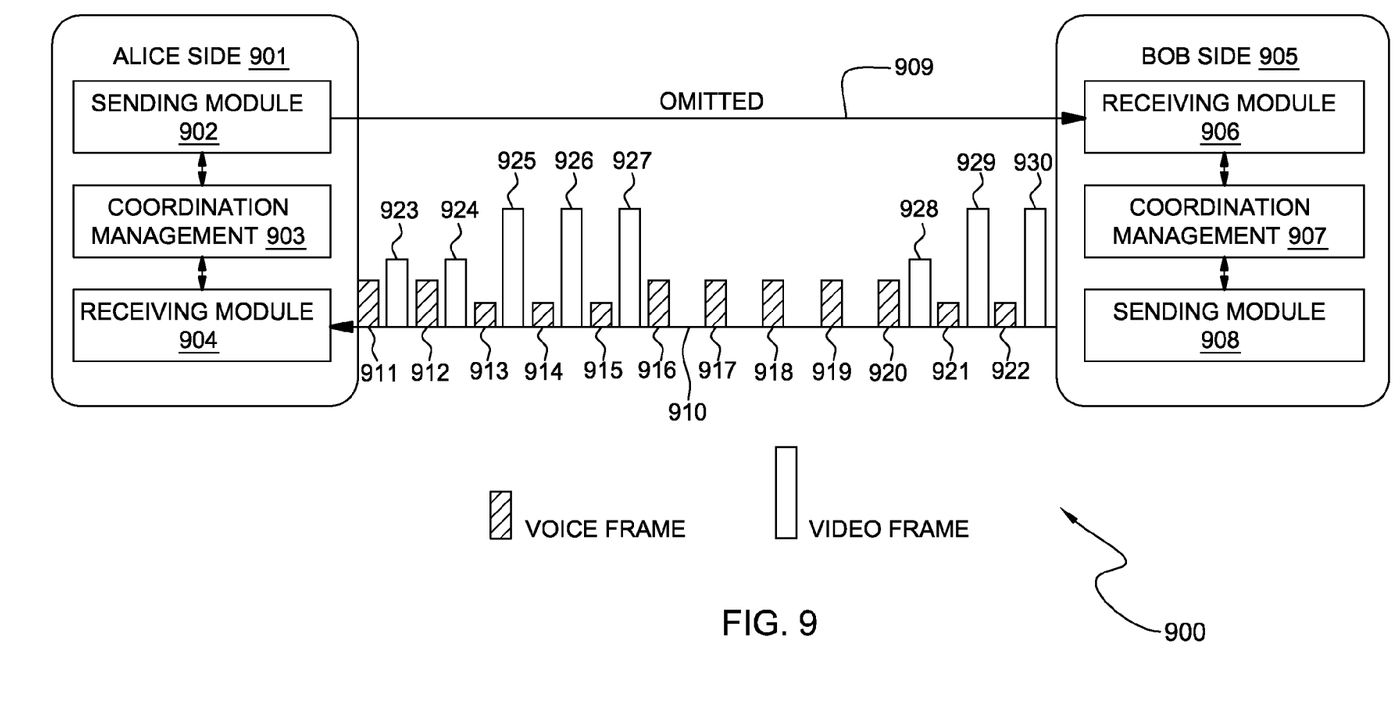
FIG. 9 is a use case diagram which shows the combined real-time voice and video transmission strategies presented in aspects of the present invention.

FIG. 9 is a use case diagram 900 which shows one example of a combined real-time voice and video transmission scheme presented in the aspects of the present invention. Again there are two sides of the video call: Alice side 901 has a sending module 902, a receiving module 904 and a coordination management module 903; Bob side 905 has a sending module 908, a receiving module 906 and a coordination management module 907. The black blocks (911-922) are voice packets, where the shorter ones present the silent frames (913-915, 921-922) and the longer ones present the talk-spurt frames (911-912,916-920). When SAVV Algorithms in the present invention are applied, during talk spurts, the size of the video fragments may be smaller than that of the video fragments during silent periods. Therefore the jitter and delay of the voice stream and the two streams on the whole may be reduced.

Although the present invention and its advantages have been described in detail, it should be understood that various changes, substitutions and alterations can be made herein without departing from the spirit and scope of the invention as defined by the appended claims.

The invention claimed is:

1. A method of real-time voice and video transmission between a transmitting party and a receiving party using silent periods and talk-spurt characteristics of conversational speech, the method comprising:
    detecting silence information from a voice codec at the transmitting party; and
    dividing a current video stream comprising multiple frames of the video transmission into a plurality of video fragments according to one or more characteristics of one or more silent periods in a transmission voice stream, wherein the plurality of video fragments vary in size based on the one or more characteristics of the one or more silent periods in a transmission voice stream;
    transmitting the plurality of video fragments preferentially during one or more silent periods;
    receiving the plurality of video fragments and a plurality of voice fragments at the receiving party; and
    playing back the plurality of video fragments and the plurality of voice fragments at the receiving party.

2. A method according to claim 1, wherein the dividing is performed according to silence information obtained from a voice encoder and a transmitting voice stream analyzer.

3. A method as claimed in claim 2, wherein the dividing comprises:
dividing the current video stream according to a ratio between video frame size and voice frame size; and
increasing a size of a current video fragment when a current voice frame is a silent frame.

4. A method according to claim 3, wherein the transmitting comprises:
transmitting the current voice frame via a voice transmission port; and
transmitting the current video fragment immediately after transmitting the current voice frame via a video transmission port.

5. A method according to claim 3, wherein the transmitting comprises:
associating the current video fragment to the current voice frame; and
transmitting current voice packets and current video packets via a conventional transmission port.

6. A method according to claim 2, wherein the dividing comprises:
dividing the current video stream according to a ratio between video frame size and voice frame size;
incrementing a size of a current video fragment when a current voice frame is a silent frame; and
iteratively adjusting a size of a next video fragment.

7. A method according to claim 6, wherein the transmitting comprises:
transmitting the current voice frame via a voice transmission port; and
transmitting the current video fragment immediately after transmitting the current voice frame via a video transmission port.

8. A method according to claim 6, wherein the transmitting comprises:
associating the current video fragment to the current voice frame; and
transmitting current voice packets and current video packets via a conventional transmission port.

9. A method according to claim 1, further comprising generating a plurality of video frames dependent on one or more characteristics of one or more silent periods in a voice stream as received at the receiving party.

10. A method according to claim 1, further comprising generating one or more key video frames according to silence information obtained from a voice decoder and a receiving voice stream analyzer.

11. A method according to claim 10, wherein the generating comprises:
obtaining silence information from the receiving voice stream analyzer; and
instructing a video encoder to generate a key video frame if a chosen number of consecutive receiving voice frames are silent frames, or if a maximum time interval between two consecutive key video frames is exceeded.

12. Apparatus for managing real-time voice and video transmission comprising:
a memory; and
a processor in communications with the memory to perform a method of real-time voice and video transmission between a transmitting party and a receiving party using silent periods and talk-spurt characteristics of conversational speech, the method comprising:
capturing, encoding, buffering and sending real-time voice and video data;
receiving, buffering, decoding and playback of the real-time voice and video data;
collecting and analyzing silence information in a transmitting voice stream;
generating and updating video stream transmission strategies based on the analyzed silence information; and
dividing a current video stream comprising multiple frames of the video transmission into a plurality of video fragments varying in size according to a current video stream transmission strategy.

13. Apparatus according to claim 12, the method further comprising collecting and analyzing the silence information in a receiving voice stream, and wherein the generating and updating is also based on the analyzed silence information in the receiving voice stream.

14. Apparatus according to claim 13, wherein the dividing comprises:
dividing the current video stream according to a ratio between video frame size and voice frame size; and
increasing a size of a current video fragment when a current voice frame is a silent frame.

15. Apparatus according to claim 13, wherein the dividing comprises:
dividing the current video stream according to a ratio between video frame size and voice frame size;
incrementing a size of a current video fragment when a current voice frame is a silent frame; and
iteratively adjusting a size of a next video fragment.

16. Apparatus according to claim 12, the method further comprising generating a plurality of video frames dependent on one or more characteristics of one or more silent periods in a voice stream as received at the receiving party.

17. Apparatus according to claim 12, the method further comprising generating one or more key video frames according to silence information obtained from a voice decoder and a receiving voice stream analyzer.

18. Apparatus according to claim 17, wherein the generating comprises:
obtaining silence information from the receiving voice stream analyzer; and
instructing a video encoder to generate a key video frame if a chosen number of consecutive receiving voice frames are silent frames, or if a maximum time interval between two consecutive key video frames is exceeded.

* * * * *